United States Patent [19]

Gale et al.

[11] Patent Number: 4,576,439
[45] Date of Patent: Mar. 18, 1986

[54] REFLECTIVE DIFFRACTIVE AUTHENTICATING DEVICE

[75] Inventors: Michael T. Gale, Wettswil; Karl H. Knop, Zurich; Martin Ebnöther, Affoltern a. Albis, all of Switzerland

[73] Assignee: RCA Corporation, Princeton, N.J.

[21] Appl. No.: 520,824

[22] Filed: Aug. 5, 1983

[30] Foreign Application Priority Data

Sep. 15, 1982 [GB] United Kingdom ................ 8226232

[51] Int. Cl.⁴ ........................... G02B 5/18; B32B 3/30
[52] U.S. Cl. ........................... 350/162.23; 350/162.17; 350/162.2; 283/91; 283/107; 283/902
[58] Field of Search ................... 283/17, 91, 107, 902; 350/162.17, 162.18, 162.2, 162.23

[56] References Cited

U.S. PATENT DOCUMENTS 4,034,211 7/1977 Horst et al. .................... 350/162.23
4,184,700 1/1980 Greenaway ........................... 283/17
4,426,130 1/1984 Knop ................................ 350/162.2

FOREIGN PATENT DOCUMENTS 3206062 2/1982 Fed. Rep. of Germany .
2093404 2/1982 United Kingdom .

Primary Examiner—Bruce Y. Arnold
Assistant Examiner—William Propp
Attorney, Agent, or Firm—Joseph S. Tripoli; George E. Haas; George J. Seligsohn

[57] ABSTRACT

A reflective-diffractive coating layer, situated at the interface between a substrate layer and an overcoat layer of the device, is divided into a set of small, slightly separated regions. This allows a direct bond of the overcoat layer to the substrate layer within the separation areas, which direct bond provides a more secure bond than that provided by a bond of the coating layer to the substrate and overcoat layers.

11 Claims, 7 Drawing Figures

REFLECTIVE DIFFRACTIVE AUTHENTICATING DEVICE

This invention relates to an improvement in an authenticating device for use in authenticating an item of sheet material when the device is bonded to the item.

Reference is made to (1) U.S. patent application Ser. No. 235,970, filed by Webster, et al. on Feb. 19, 1981, and (2) U.S. patent application Ser. No. 387,614, filed by Knop, et al. on June 11, 1982. Both of these patent applications, which are assigned to the same assignee as the present invention, disclose an authenticating device comprised of an integrated structure of a substrate layer and a transparent overcoat layer separated from one another by a coating layer that is situated in intimate contact with the substrate and overcoat layers at the interface therebetween. The interface includes a reflective diffraction grating in the form of a relief pattern, the grating having specified grating profile, physical amplitude and line-period parameters that operate to separate polychromatic illuminating light incident thereon into at least one pair of light beams of contrasting colors.

In particular, the authenticating device disclosed in the Webster, et al. patent application employs a metallic coating layer that forms metalized reflective diffraction elements of a rectangular-wave profile or a sinusoidal profile diffraction grating relief pattern that is embossed on the surface of either the substrate layer or the overcoat layer at the interface therebetween. Further, the diffraction grating structure in Webster, et al. is specified as being operative to separate polychromatic light incident thereon into at least one pair of adjacent, separate and distinct, reflected beams of contrasting colors, wherein the size of the narrowest angular dimension of the beam-width of each of the beams at a distance of 30 centimeters is at least 2 milliradians.

The Knop, et al. patent application discloses an authenticating device that employs a dielectric coating layer situated at the interface of dielectric substrate and overcoat layers, in which the index-of-refraction of the coating layer is higher than that of the substrate layer and that of the overcoat layer. This enables the Knop, et al. authenticating device to operate as a diffractive substractive color filter responsive to the angle of incidence of polychromatic illuminating light.

Reference is further made to U.S. patent application Ser. No. 235,972, filed by Knop on Feb. 19, 1981. This application discloses a fine-line reflective "semi-thick" sinusoidal grating structure which has utility in an authenticating device of the type disclosed in the aforesaid Webster, et al. application.

In order to prevent tampering with an authenticating device, it is important that the bond at the interface of the substrate and overcoat layers be sufficiently secure to prevent removal of the overcoat layer without effectively destroying the diffraction grating structure at the interface. In both the case of the authenticating device disclosed in Webster, et al. and the case of the authenticating device disclosed in Knop, et al. the overcoat layer and the substrate layer are usually composed of the same plastic material (or, at least, compatible plastic materials), so that a direct bond of the overcoat layer to the substrate layer would be extremely secure. However, a bond of the metallic coating layer in Webster, et al. to the plastic overcoat layer and to the plastic substrate layer is significantly less secure than would be the direct bond of the overcoat layer to the substrate layer. Similarly, a bond of the dielectric coating layer in Knop, et al. to the plastic overcoat layer and to the substrate layer is significantly less secure than would be a direct bond of the overcoat layer to the substrate layer. In fact, Knop, et al. specifically discusses this fact in connection with the description of certain idealized species disclosed therein. In these idealized species, the dielectric coating layer is discontinuous within each grating line period of the diffraction grating structure, thereby permitting the overcoat layer to be directly bonded to the substrate layer at the coating-layer discontinuity within each grating line. However, Knop, et al. also bring out the fact that, in practice, deposition techniques, such as evaporation or ion beam sputtering, for fabricating the dielectric coating layer, are not practical in achieving such idealized species (in which a discontinuity within each grating line period of the diffraction grating structure permits direct bonding of the overcoat layer to the substrate layer).

The present invention is directed to a practical technique for achieving the highly secure direct bonding of the overcoat layer to the substrate layer of an authenticating device of the types disclosed in Webster, et al. and the Knop, et al. applications, without producing any significant adverse effect on the desirable optical properties of such authenticating devices. More specifically, in accordance with the principles of the present invention, the coating layer is divided in at least one dimension into a set of separated regions, adjacent ones of the regions being separated from one another in at least the one dimension by a spacing distance a, the center-to-center distance of adjacent ones of the regions in at least the one dimension being b. The respective values of a and b are characterized in that b is on the order of ten times larger than a, a is larger than the line-period of the diffraction grating and b is sufficiently small as to be barely noticeable to the naked eye of the observer. Further, the overcoat layer is directly bonded to the substrate layer within the separation between adjacent ones of the regions of the coating layer.

Figure 2A:
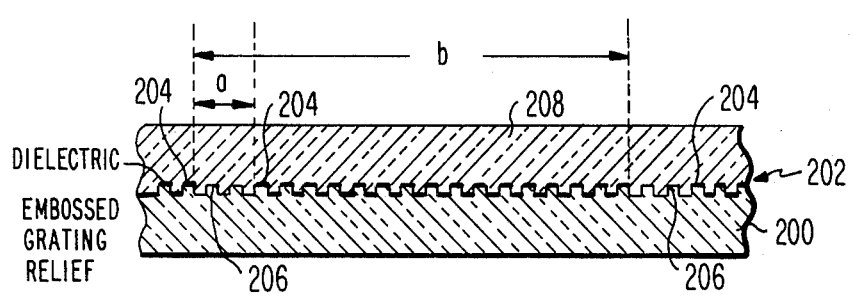
FIGS. 2a and 2b illustrate an authenticating device incorporating an embodiment of the present invention.
Figure 2B:
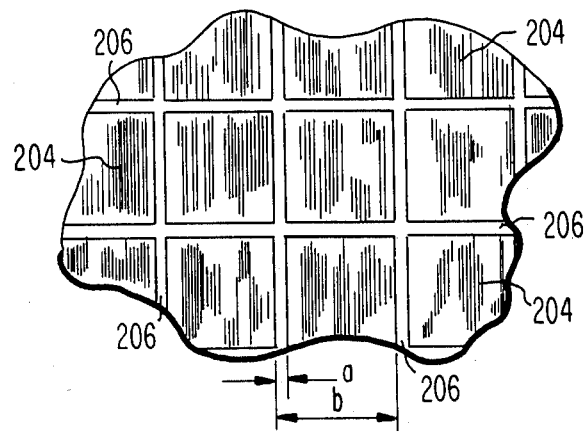
Figure 3:
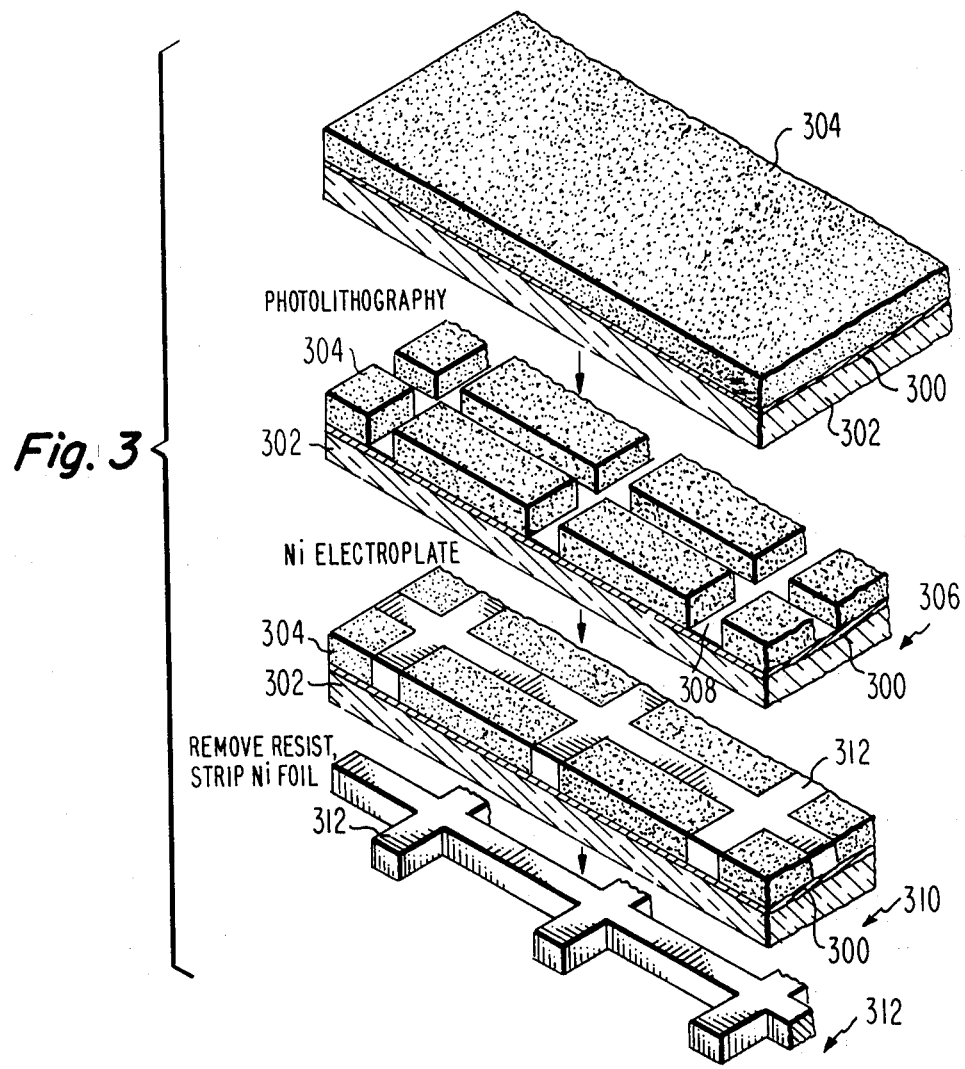
Figure 4A:
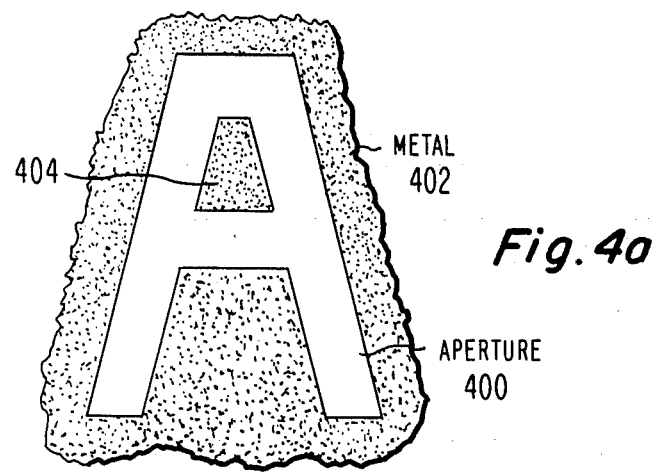
Figure 4B:
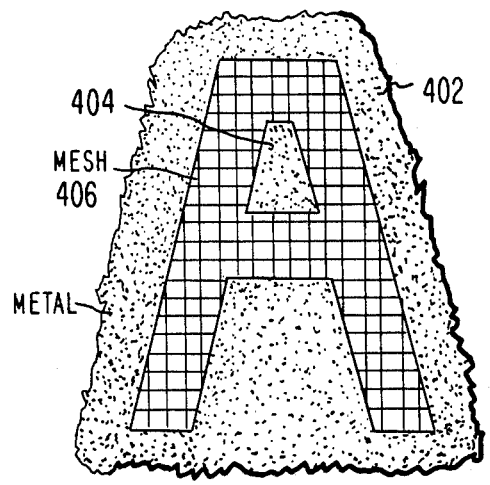

FIG. 3 is a flow diagram illustrating a technique of producing a nickel foil mask used in the fabrication of an authenticating device of the type shown in FIGS. 2a and 2b; and FIG. 4a illustrates the problem of including in an authenticating device, a diffractive structure in the shape of a symbol, such as "A", in the absence of the teachings of the present invention, and FIG. 4b illustrates how the use of the teachings of the present invention solves this problem.

Figure 1A:
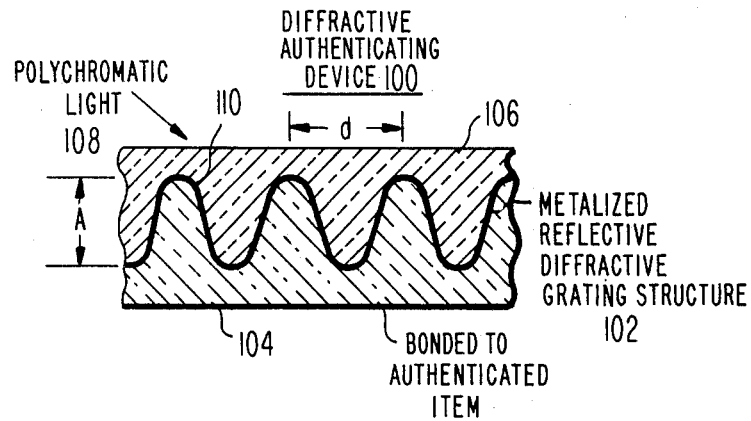
FIGS. 1a and 1b are illustrative showings of the prior art diffractive authenticating devices disclosed, respectively, in aforesaid Webster, et al. and Knop, et al. applications.

FIG. 1a is a diffractive authenticating device 100 of the type disclosed in the aforesaid Webster, et al. application. As indicated in FIG. 1a, diffractive authenticating device 100 is comprised of metalized reflective diffractive grating structure 102 formed at the interface of substrate layer 104 and overcoat layer 106. Substrate layer 104 is usually comprised of plastic (although this is not essential), the bottom surface of which is intended to be bonded to an authenticated item of sheet material (not shown). Overcoat layer 106, which is transparent to incident polychromatic light 108, usually is also comprised of a plastic material (which may be the same plastic material as that of which substrate layer 104 is composed). One of layers 104 and 106 (usually substrate layer 104) has diffractive grating structure 102 embossed therein and a metal coating layer (such as aluminum) deposited on the grating structure before the two layers 104 and 106 are bonded together.

As indicated in FIG. 1a, the physical amplitude of the diffractive grating structure is A and the line period of the diffractive grating structure 102 is d. The profile shape of each line element of diffractive grating structure 102 may be sinusoidal (as specifically shown in FIG. 1a) or, alternatively, it may be rectangular (similar to the profile shape shown in FIG. 1b). In any case, authenticating device 100 responds to polychromatic light incident on metalized reflective diffractive grating structure 102 to reflect diffracted light that exhibits contrasting colors at different viewing angles. Specifically, the Webster, et al. invention discloses a diffractive authenticating device 100 in which the reflective diffraction grating structure is formed as a relief pattern having specified grating profile, physical amplitude and line frequency (line-period) parameters, such that the structure is operative to separate polychromatic illuminating light incident thereon into at least one pair of adjacent, separate and distinct, reflected beams of contrasting colors, wherein the size of the narrowest angular dimension of the beam-width of each of the beams at a distance of 30 centimeters is at least 2 milliradians. However, the present invention is not limited to such metalized reflective diffractive grating structures. The present invention includes other types of reflective diffractive grating structures, such as a reflective hologram, and the "semi-thick" phase grating structures disclosed in the aforesaid Knop application, Ser. No. 235,972, in which reflection takes place from a metallic or non-metallic coating layer situated at the relief-pattern interface of substrate and overcoat layers 104 and 106. What is significant, from the point of view of the present invention, is that presence of a coating layer 110 (indicated by the thickness of metalized diffractive grating structure 102) sandwiched between substrate layer 104 and overcoat layer 106 results in a significantly less secure bond than that which would be provided by a direct bond between substrate layer 104 and overcoat layer 106.

Figure 1B:
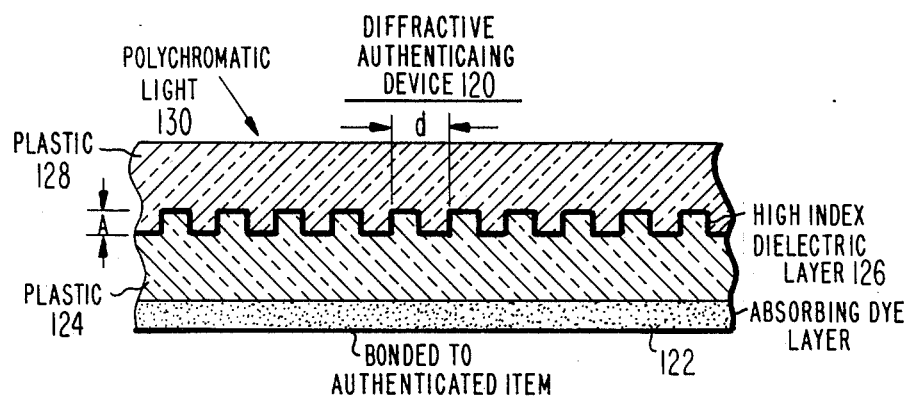

FIG. 1b illustrates a diffractive authenticating device 120 of the type disclosed in the aforesaid Knop, et al. application. Diffractive authenticating device 120 is comprised of an absorbing dye layer 122, a transparent plastic substrate layer 124, a high index-of-refraction dielectric coating layer 126, having at least a given thickness and a transparent plastic overcoat layer 128.

The index-of-refraction of dielectric layer 126 (which is usually an inorganic compound) is significantly higher than the respective indices-of-refraction of substrate layers 124 and 128. However dielectric layer 126 conforms to a relief pattern that forms a diffractive grating structure at the interface of substrate and overcoat layers 124 and 128. The line period d of this diffractive grating structure is sufficiently small relative to any wavelength included in incident polychromatic light 130 so that only the zero diffractive order can propagate in relatively low index-of-refraction substrate layer 124 and overcoat layer 128, but both the zero and first diffraction orders can propagate along the high index dielectric coating layer 126. In accordance with the Knop, et al. invention, the result is that one portion of incident polychromatic light 130 is reflected from high index dielectric coating layer 126 (at an angle of reflection equal to the angle of incidence of the polychromatic light) and the remaining portion of polychromatic light 130 is transmitted through substrate layer 124 and then is absorbed by absorbing dye layer 122 (which is intended to be bonded to the authenticated item, not shown). An important feature of the Knop, et al. invention is that the color exhibited by the reflected light varies in accordance with the angle of incidence of polychromatic light 130 and the orientation of the grating. If, as is usual, polychromatic light 130 is ambient, non-directional light, the color of the reflected light will change as a function of the viewing angle of an observer and orientation of the grating. It is this characteristic that makes device 120 operate as a superior diffractive authenticating device.

However, the required presence of high index dielectric coating layer 126 sandwiched between substrate layer 124 and overcoat 128 at the interface therebetween, provides a significantly less secure bond than that which would be provided by a direct bond between plastic 128 and plastic 124 (which normally are made of the same material).

For descriptive purposes, FIGS. 2a and 2b of the present invention are shown as applying to a modification to the structure of the high index dielectric coating layer type of diffractive authenticating device shown in FIG. 1b. However, it should be understood that the present invention applies with equal force to a similar modification of the structure of a metal coating layer type of diffractive authenticating device shown in FIG. 1a.

In FIGS. 2a and 2b, substrate layer 200 has its top surface embossed with a diffration grating relief pattern of the type shown in FIG. 1b. However, the dielectric coating layer 202 is divided into a set of separated regions 204 (indicated in FIG. 2a by a thick line), adjacent ones of regions 204 being separated from one another by separation areas 206 having a spacing distance a (indicated in FIG. 2a by a thin line). The center-to-center distance of adjacent ones of regions 204 is b. Reflective diffraction takes place only from regions 204, where coating layer 202 is present. For this reason, the diffraction grating pattern is not shown within separation areas 206 of the plan view of FIG. 2b. As more specifically shown in the plan view of FIG. 2b, the coating layer 202 is divided in both of two orthogonal directions into a set of separated square regions 204 with one of the two orthogonal directions being oriented parallel to the diffraction grating lines and the other of the two orthogonal directions being oriented perpendicular to the grating lines. As indicated in FIG. 2b, adjacent ones of square regions 204 are separated from one another in both orthogonal directions by a spacing distance a, and the center-to-center distance of adjacent ones of square regions 204 is b in both orthogonal directions. The area of each square region is $(b-a)^2$. In accordance with the principles of the present invention, the respective values of a and b are characterized in that b is on the order of ten times larger than a, a is significantly larger than the line-period of the diffraction grating (so that no reflective diffraction takes place within a separation areas 206 and further the spacing distance a is too large to itself diffract light wavelengths). Further, b is sufficiently small as to be at most barely noticeable to the naked eye of an observer (i.e., at a normal viewing distance, such as about 30 centimeters the pattern of square regions 204 shown in FIG. 2b is too small to be clearly discernible to the naked eye of an observer). Typical values of a are in the range of 10-30 micrometers and typical values of b are in the range of 100-300 micrometers with the type of diffractive authenticating device disclosed in the aforesaid Knop, et al. application. It should be noted, however, that other values for a and b not in this range (but which meet the qualitative constraints set forth above) may be found to be desirable for other applications.

It is clear that overcoat layer 208 is in direct contact with substrate layer 200 within the a separation areas 206. Extremely strong and secure bonding can be achieved by choosing suitable materials for substrate and overcoat layers 200 and 208. For example, PVC (polyvinylchloride) sheet material can be used for both substrate layer 200 and overcoat layer 208. On applying overcoat layer 208 by conventional hot pressing techniques, the PVC overcoat layer 208 fuses with the PVC of substrate layer 200, thereby forming strong adhesion of the two layers within a separation areas 206. Other possible materials include other plastics such as polycarbonate. The substrate and overcoat layer materials do not necessarily have to be identical as long as good bonding can be achieved in the areas of intimate contact. For instance, overcoat materials such as thermal or UV curable epoxies may also be suitable. If the substrate and overcoat layers materials have the same refractive index (as the case in which both layers are formed of the same material) or very similar indices-of-refraction, the optical homogeneity at the embossed substrate interface disappears within the a separation areas 206. However, if the refractive indices are somewhat different (the difference between suitable materials being no more than 0.1), weak optical diffraction effects take place by the remaining interface phase grating. However, these effects are generally too weak to be visible under normal viewing conditions.

The patterned structure of square regions 206 shown in FIGS. 2a and 2b can be fabricated by a number of techniques known in the art. One technique which has been successfully demonstrated is to use a suitable mask during the evaporation of the dielectric coating layer material onto the embossed surface of substrate layer (e.g., PVC) layer 200. The mask is a self-supporting thin nickel (Ni) metal foil positioned close-to or in-contact with the embossed surface. The dielectric material is deposited only in the open areas of the mask and is thus patterned in the designated form shown in FIGS. 2a and 2b. Such a mask can be fabricated by the steps shown in FIG. 3. A conducting substrate such as thin chromium (Cr) layer 300 on glass blank 302 that is coated with a thick layer 304 of positive photoresist (e.g., Shipley AZ 1350 H). This blank is then patterned by conventional photolithographic techniques, shown in step 306, to reveal only those regions 308 of Cr layer 300 that are intended to correspond to the a separation areas 206. In the next step 310, an electroplating bath is used to deposit a layer 312 of Ni about ten micrometers thickness in the revealed areas of the electrically conducting Cr layer 300. In the final step 312, the remaining photoresist is removed and a resultant self-supporting nickel foil layer is stripped from the underlying blank 302 and Cr layer 300, as shown in FIG. 3. The resulting Ni foil structure forms a mesh-pattern mask. This foil mask can be attached to a still stronger supporting metal ring for convenient handling and mounting in the evaporator, in which the mesh-pattern mask operates to divide the deposited coating layer into a corresponding pattern of square regions 204 shown in FIG. 2b. Such a mask can be used for approximately 50-100 evaporation steps before excess dielectric-build-up on the metal lines and surrounds begins to become a problem. In a volume production process, the mask must thus be changed at regular intervals. However, the mask can be cleaned by immersion in a suitable solvent for the dielectric.

Often in fabricating the diffractive authenticating device of the types disclosed in the aforesaid Webster, et al. and Knop, et al. applications, it is desirable to include diffractive structures in the shape of given symbols or characters. Some characters, such as the letter "A" or "O", define an interior "island" region which is completely detached from the region exterior to the character. For instance, as shown in FIG. 4a, any attempt to construct an "A" shaped region as an aperture 400 in a metal mask 402 is unlikely to succeed because the metal mask 402 must include an "island" region 404 that is totally isolated from the exterior portion of metal region 402 by aperture 400. Thus, there is no way of supporting region 404 in FIG. 4a. However, by employing a nickel self-supporting mesh 406, as shown in FIG. 4b, as part of the metal mask 402, the interior region 404 of mask 402 is physically attached to the exterior region thereof. The mask shown in FIG. 4b, utilizing a mesh 406 fabricated in the manner shown in FIG. 3, can be used to fabricate a diffractive authenticating device (or a portion thereof) of the type shown in FIGS. 1a and 1b (modified in accordance with the present invention shown in FIGS. 2a and 2b) of a character or symbol having an interior "island" region, such as the letter "A".

In the preferred embodiment of the invention disclosed herein, the coating layer is divided into square regions 204, in which adjacent regions are separated from one another by the same spacing distance a in each of two orthogonal dimensions, however, this is not essential. All that is required is a modification of the structure of a diffractive authenticating device, such as that shown in FIGS. 1a or 1b, in a manner in which the coating layer at the interface between the substrate layer and the overcoat layer is divided at least in one dimension into a set of separated regions, in which adjacent ones of the regions are separated from one another in at least this one dimension by a spacing distance a and the center-to-center distance of adjacent ones of the regions in at least this one dimension is b. Further, it is important that the respective values of a and b conform to the qualitative constraints set forth above in connection with FIGS. 2a and 2b. Thus, even when the coating layer is divided in each of two dimensions, the dimensions need not be orthogonal to one another or to the diffraction grating structure, nor need the spacing distance $a_1$ in a first of the two dimensions be equal to the spacing distance $a_2$ in the second of the two dimensions, nor need the center-to-center distance $b_1$ of adjacent ones of the regions in the first of the two dimensions be equal to the center-to-center distance $b_2$ in the second of the two dimensions.

Generally, the set of separated regions are periodically distributed, with the spacing period of the regions being b. However, such spatial periodic distribution of the regions is not essential. The benefits of the present invention are achieved even when the respective values of a and b of one pair of adjacent ones of the separated regions are different from those of another pair of the separated regions, so long as the respective values of a and b conform to the qualitative constraints set forth above in connection with FIGS. 2a and 2b.

What is claimed is;

1. In an authenticating device for use in authenticating an item of sheet material when said device is bonded to said item; wherein said device comprises an integrated structure of a substrate layer and a transparent overcoat layer separated from one another by a coating layer that is situated in intimate contact with said substrate and overcoat layers at the interface therebetween, said interface including a reflective diffraction grating in the form of a relief pattern, said grating having specified grating-profile, physical-amplitude and line-period parameters that operate to separate polychromatic illuminating light incident thereon into at least one pair of light beams of contrasting colors, and wherein the bond of said coating layer to said respective substrate and overcoat layers at said interface is significantly less secure than is a direct bond of said substrate to said overcoat layer; the improvement wherein:

said coating layer is divided in at least one dimension into a set of separated regions, adjacent ones of said regions being separated from one another in at least one dimension by a spacing distance a, the center-to-center distance of adjacent ones of said regions in at least said one dimension being b;

the respective values of a and b being characterized in that b is on the order of ten times larger than a, a is significantly larger than the line-period of said diffraction grating, and b is sufficiently small as to be at most barely noticeable to the naked eye of an observer; and said overcoat layer being directly bonded to said substrate layer within the separation between adjacent ones of said regions of said coating layer.

2. The authenticating device defined in claim 1, wherein said pair of beams is comprised of adjacent, separate and distinct beams in which the size of the narrowest angular dimension of the beam width of each of said beams at a distance of thirty centimeters is at least two milliradians.

3. The authenticating device defined in claim 1, wherein said coating layer is a metallic layer.

4. The authenticating device defined in claim 1, wherein said coating layer is a dielectric layer.

5. The authenticating device defined in claim 1, wherein said regions are periodically distributed spatially in at least said one dimension with the spacing period being b.

6. The authenticating device defined in claim 5,
wherein the value of a is in the range of 10–30 micrometers and the value of b is in the range of 100–300 micrometers.

7. The authenticating device defined in claim 1,
wherein said coating layer is divided in each of two dimensions into a set of separated regions, adjacent ones of said regions being separated from one another in a first of said two dimensions by a first spacing distance $a_1$, and in a second of said two dimensions by a second spacing distance $a_2$, the center-to-center distance of adjacent ones of said regions in said first of said two dimensions being $b_1$ and in said second of said two dimensions being $b_2$;

the respective values of $a_1$, $a_2$, $b_1$, and $b_2$ being characterized in that each of $b_1$ and $b_2$ is on the order of ten times larger than each of $a_1$ and $a_2$, each of $a_1$ and $a_2$ is larger than the line-period of said diffraction grating, and each of $b_1$ and $b_2$ is sufficiently small as to be barely noticeable to the naked eye of the observer;

said overcoat layer being directly bonded to said substrate layer within the separation between adjacent ones of said regions of said coating layer in both said first and second of said two dimensions.

8. The authenticating device defined in claim 7,
wherein said regions are periodically distributed spatially in said first of said two dimensions with the spacing period being $b_1$ and in said second of said two dimensions with the spacing period being $b_2$.

9. The authenticating device defined in claim 8,
wherein said first and second of said two dimensions are substantially orthogonal to one another.

10. The authenticating device defined in claim 9,
wherein the value of each of $a_1$ and $a_2$ is in the range of 10–30 micrometers and the value of each of $b_1$ and $b_2$ is in the range of 100–300 micrometers.

11. The authenticating device defined in claim 10,
wherein $a_1$ is substantially equal to $a_2$ and $b_1$ is substantially equal to $b_2$.

* * * * *